United States Patent [19]
Polhemus

[11] Patent Number: 5,337,025
[45] Date of Patent: Aug. 9, 1994

[54] ADAPTIVE EQUALIZATION CIRCUIT FOR EQUALIZING THE FREQUENCY RESPONSE OF VARYING LENGTHS OF TRANSMISSION LINE

[75] Inventor: Gary D. Polhemus, Limerick, Me.

[73] Assignee: National Semiconductor Corporation, Santa Clara, Calif.

[21] Appl. No.: 7,340

[22] Filed: Jan. 21, 1993

[51] Int. Cl.$^5$ ............................................. H03H 11/06
[52] U.S. Cl. ..................................... 333/28 R; 375/11
[58] Field of Search ............................. 333/18, 28 R; 375/11–13

[56] References Cited

U.S. PATENT DOCUMENTS

| | | | |
|---|---|---|---|
| 3,336,540 | 8/1967 | Kwartiroff et al. | 333/28 R |
| 3,728,649 | 4/1973 | Waldhauer | 333/18 |

*Primary Examiner*—Paul Gensler
*Attorney, Agent, or Firm*—Limbach & Limbach

[57] ABSTRACT

An adaptive equalization circuit which has first path that includes a boost stage and a first variable gain stage and a second path that includes a second variable gain stage. The first path generates a fully equalized signal in response to an input signal while the second path generates an unequalized signal in response to the input signal. A summing stage combines the fully equalized signal and the unequalized signal to produce an equalized output signal. A first control line limits the gain of the first variable gain stage while a second control line limits the gain of the second variable gain stage so that when the maximum length of transmission line is utilized, the equalized output signal is formed substantially by the fully equalized signal, when a minimum length of transmission line is utilized, the equalized output signal is formed substantially by the unequalized signal, and when an intermediate length of transmission line is utilized, the equalized output signal is formed from a portion of both the fully equalized signal and the unequalized. signal.

21 Claims, 7 Drawing Sheets

ADAPTIVE EQUALIZATION CIRCUIT FOR EQUALIZING THE FREQUENCY RESPONSE OF VARYING LENGTHS OF TRANSMISSION LINE

BACKGROUND OF THE INVENTION

1. Field of the Invention

The present invention relates to the receiver circuitry of devices connected to a transmission line and, in particular, to a circuit for equalizing varying lengths of transmission line.

2. Description of the Related Art

A length of transmission line, which is in excess of a minimum length, attenuates the high-frequency components of a data signal transmitted across the transmission line. The degree of high-frequency attenuation is dependent upon the length of the transmission line and can be mathematically represented as a transfer function.

An equalization amplifier is a device that compensates the data signal for frequency attenuation. The frequency effect of the equalization amplifier can also be mathematically represented as a transfer function. Thus, by forming an equalization amplifier which has a transfer function which is approximately the inverse of the transfer function of the transmission line, substantially all of the high-frequency components attenuated by the transmission line can be recovered.

FIG. 1 shows a schematic of one example of a equalization amplifier 2 based upon a differential pair configuration. As shown in FIG. 1, the differential pair generates a pair of complementary output signals $V_{eo}+/-$ in response to a pair of complementary input signals $V_{ei}+/-$.

The differential pair includes a first input transistor T1, a second input transistor T2, and an inverse transfer function generator 4. Transistor T1 has its base connected to receive the positive input signal $V_{ei}+$, its collector connected to a power supply through a first output resistor Rec1, and its emitter connected to ground through a first current source Iec1.

Transistor T2 has its base connected to receive the negative input signal $V_{ei}-$, its collector connected to the power supply through a second output resistor Rec2, and its emitter connected to ground through a second current source Iec2. Transistors T1 and T2 are biased by current sources Iec1 and Iec2 and collector load resistors Ree1 and Rec2 for linear operation as a differential amplifier.

The inverse transfer function generator 4 includes an emitter resistor Re1, a first capacitor Ce1, and a second capacitor Ce2 and a transfer resistor Re2 connected in series with the second capacitor Ce2, each of which are connected between the emitter of input transistor T1 and the emitter of input transistor T2.

The voltage transfer function of equalization amplifier 2 can be determined by first considering a circuit which is a simplified model of the FIG. 1 circuit. FIG. 2 shows a simplified, medium-frequency, small-signal circuit diagram which is equivalent to one-half of the differential pair illustrated in FIG. 1. Using the concept of symmetry, associated with the balanced driving of a differential amplifier, and given the practical assumptions that the impedance $Z(s) \gg 1/g_m$ for the frequency range of the application, that $g_m = I_{ec1}q/KT = I_{ec1}/0.0259$ @27° C., and that $r_\pi = \beta/g_m$, the voltage transfer function Vout/Vin can be calculated to equal:

$$\frac{V_{out}}{V_{in}} = \frac{-Rec1}{Z(s)} \quad \text{EQ. A}$$

The impedance $Z(s)$ can be determined by first considering a circuit which is a symmetrical equivalent to inverse transfer function generator 4 of the FIG. 1 circuit. FIG. 3 shows a point of symmetry circuit diagram which is equivalent to inverse transfer function generator 4 of FIG. 1. As shown in FIG. 3, the values of Re1 and Re2 have each been divided by half and divided equally around a point of symmetry line, while Ce1 and Ce2 have been doubled and divided equally around the point of symmetry line 6.

The impedance $Z(s)$ is next determined by considering one side of the FIG. 3 circuit. FIG. 4 shows a circuit diagram illustrating one side of the FIG. 3 circuit. As shown in FIG. 4, $Z(s)$ is a complex impedance composed of resistors R1 and R2 and capacitors C1 and C2 where R1=Re1/2, R2=Re2/2, C1=2*Ce1 and C2=2*Ce2. The actual driving point impedance for $Z(s)$ can then be described by:

$$Z(s) = \frac{R1(1 + sR2C2)}{(R1 \cdot R2 \cdot C1 \cdot C2)s^2 + (R1 \cdot C1 + R2 \cdot C2 + R1 \cdot C2)s + 1} \quad \text{EQ. B}$$

Again, given assumptions practical for this application, the impedance $Z(s)$ can be simplified and described by:

$$Z(s) \approx \frac{R1(1 + sR2C2)}{(1 + sC2(R1 + R2))\left(1 + sC1\left(\frac{R1 \cdot R2}{R1 + R2}\right)\right)} \quad \text{EQ. C}$$

where $(R1+R2) \geq 2R2$ and $C2 > C1$.

FIG. 5 shows the magnitude of an impedance versus frequency plot. As shown in FIG. 5, the impedance $Z(s)$ first exhibits a low frequency value equal to Re1, then reduces to a value equal to Re1 in parallel with Re2 for mid-band frequencies, and finally approaches zero as the frequency is increased towards infinity.

The breakpoints in the impedance versus frequency curve of FIG. 5 represent the designed poles and zeros for the equalization amplifier shown in FIG. 1. The transfer function for the equalization amplifier is given by substituting EQ. C into EQ. A. Using the component variables from FIG. 1, the transfer function can be described by:

$$\frac{V_{out}}{V_{in}} \approx \frac{-(Rec1 + R2c2)(1 + s\tau_{z1})(1 + s\tau_{z2})}{Re1 \quad (1 + s\tau_{p1})} \quad \text{EQ. D}$$

where $\tau_{z1} = Ce2(Re1+Re2)$, $\tau_{z2} = Ce1 \cdot Re1 \cdot Re2/Re1 + Re2$, and $\tau_{p1} = Re2Ce2$.

Thus, by correctly positioning the pole and the two zeroes, a good compensation for one length of transmission line can be created.

Although a good approximation of the inverse transfer function of one length of transmission line can be created by correctly selecting the component values for resistor Re1, resistor Re2, capacitor Ce1, and capacitor Cs2, the same component values will not adequately compensate for other lengths of transmission line. Thus, there is a need for an equalization amplifier which can adaptively accommodate different lengths of transmission line.

FIG. 6 shows an equalization amplifier 8 illustrating the equalization amplifier of FIG. 1 with a variable resistor Rv. As shown in FIG. 6, variable resistor Rv is positioned between the emitter of input transistor T1 and both capacitor Ce1 and the series connection of transfer resistor Re2 and capacitor Ce2. In operation, by varying the resistance of variable resistor Rv via a control signal Vec, the transfer function produced by the adaptive equalization amplifier changes.

Adaptive equalization amplifier 8, however, suffers from bandwidth limitations and implementation problems for a monolithic integrated circuit. As the variable resistor Rv is increased to accommodate a less lossy or shorter transmission line, a second pole is created which moves down in frequency, thereby limiting the high-frequency bandwidth. The bandwidth, therefore, is no longer independent of the correct positioning of the single pole and the two zeros. In addition, the parasitic capacitance associated with an appropriately sized JFET or MOSFET used to create the variable resistor, combined with the temperature and manufacturing variability of such components, presents a serious implementation problem for this circuit in practical monolithic integrated circuit form.

A Fiber Distributed Data Interface (FDDI) network is a local area network that provides a high bandwidth interconnection among computers and peripheral equipment using both fiber optics and copper as the transmission medium. The symbols are transmitted synchronously at a rate of 125 Megasymbols per second. An asynchronous transfer mode (ATM) network is a local area network which also provides a wide bandwidth interconnection among computers. ATM symbols are sent at a rate of 156 Mega-symbols per second.

Thus, the preferred bandwidth for an adaptive equalization amplifier utilized in a copper FDDI or ATM network is in excess of 156 MHz. When the FIG. 6 example is utilized in an FDDI network with worst case transmission lines shorter than approximately 100 meters, the second pole falls below the bandwidth required for the maximum data rate.

Thus, there is a need for an adaptive equalization amplifier which can accommodate variable length transmission lines without limiting the bandwidth of the data signal and which can be reliably produced using monolithic integrated circuit processing.

SUMMARY OF THE INVENTION

The present invention provides an adaptive equalization circuit for equalizing the frequency response of varying lengths of transmission line.

The adaptive equalization circuit adaptively compensates for the different degrees of frequency attenuation by varying the proportions of a fully equalized signal and an unequalized signal which are combined to form an equalized output signal. The circuit provides compensation for up to 100 meters of category 5 unshielded twisted pair transmission line carrying a scrambled 156 MHz clocked data stream by utilizing a second order resistor-capacitor network. Increased lengths can be compensated for by utilizing a higher order resistor-capacitor network.

The circuit also provides a relatively linear transition between 0 dB and 17 dB at a peak data frequency of 62.5 MHz (based on a 125 MHz transmit clock signal and a fixed pole at or above 156 MHz). Further, the circuit provides equal peak amplitudes for all pulse widths and multiple line lengths.

An adaptive equalization circuit in accordance with the present invention includes a boost stage that compensates for the frequency attenuation associated with a maximum length of transmission line to produce an equalized input signal. A first variable gain stage amplifies the equalized input signal to produce an amplified equalized signal in response to a first gain control signal. A second variable gain stage amplifies the input signal to produce an amplified unequalized signal in response to a second gain control signal. A summing stage combines the amplified equalized signal and the amplified unequalized signal to produce an equalized output signal.

In operation, when the maximum length of transmission line is utilized, the first gain control signal increases the gain of the first variable gain stage while the second gain control signal reduces the gain of the second variable gain stage so that the equalized output signal is substantially formed by only the amplified equalized signal.

When a minimum length of transmission line is utilized, the first gain control signal reduces the gain of the first variable gain stage while the second gain control signal increases the gain of the second variable gain stage so that the equalized output signal is substantially formed by only the amplified unequalized signal.

When an intermediate length of transmission line is utilized, the first gain control signal varies the gain of the first variable gain stage and the second gain control inversely varies the gain of the second variable gain stage so that the equalized output signal is formed by combining a portion of both the amplified equalized signal and the amplified unequalized signal.

Alternatively, an adaptive equalization circuit in accordance with the present invention can include a boost transconductance stage that compensates for the frequency attenuation associated with a maximum length of transmission line to produce an equalized current signal. A standard transconductance stage generates an unequalized current signal in response to the input voltage signal. A first variable gain current stage amplifies the equalized current signal to produce an amplified equalized current signal in response to a first current control signal. A second variable gain current stage amplifies the unequalized current signal to produce an amplified unequalized current signal in response to a second current control signal. An output stage combines the amplified equalized current signal and the amplified unequalized current signal to produce an output current and generates an equalized output signal corresponding to the output current.

In operation of this alternative circuit, when the maximum length of transmission line is utilized, the first current control signal increases the gain of the first variable gain current stage while the second current control signal reduces the gain of the second variable gain current stage so that the output current is substantially formed by only the amplified equalized current.

When a minimum length of transmission line is utilized, the first current control signal reduces the gain of the first variable gain current stage while the second current control signal increases the gain of the second variable gain current stage so that the output current is substantially formed by only the amplified unequalized current.

When an intermediate length of transmission line is utilized, the first current control signal varies the gain of the first variable gain current stage and the second current control inversely varies the gain of the second variable gain current stage so that the output current is formed by combining a portion of both the amplified equalized current and the amplified unequalized current.

A better understanding of the features and advantages of the present invention will be obtained by reference to the following detailed description and accompanying drawings which set forth an illustrative embodiment in which the principles of the invention are utilized.

DETAILED DESCRIPTION

Figure 7:
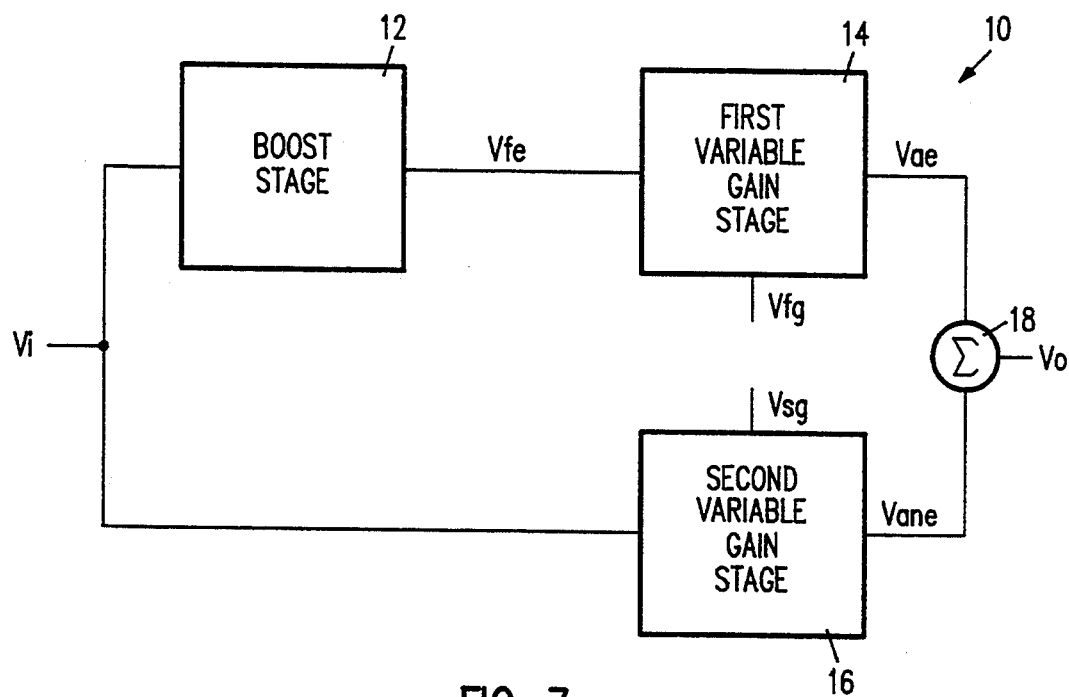
FIG. 7 is a block diagram illustrating an adaptive equalization circuit in accordance with the present invention.

FIG. 7 shows an adaptive equalization circuit 10 in accordance with the present invention. As stated above, different lengths of transmission line attenuate the high-frequency components of an input signal to different degrees. Adaptive equalization circuit 10 adaptively compensates for the different degrees of frequency attenuation by combining varying proportions of a fully equalized signal and an unequalized signal to form an equalized output signal. In the preferred embodiment of the present invention, adaptive equalization circuit 10 is utilized in the receiver circuitry of local area network devices which can be connected to other network devices by transmission lines ranging in length from a few meters to hundreds of meters.

As shown in FIG. 7, adaptive equalization circuit 10 includes a boost stage 12 that compensates an input voltage signal Vi for the frequency attenuation associated with a maximum length of transmission line to produce a fully equalized voltage signal Vfe. A first variable gain stage 14 amplifies the fully equalized voltage signal Vfe to produce an amplified equalized voltage signal Vae in response to a first gain control signal Vfg. A second variable gain stage 16 amplifies the input signal Vi to produce an amplified unequalized voltage signal Vane in response to a second gain control signal Vsg. A summing stage 18 combines the amplified equalized voltage signal Vae and the amplified unequalized voltage signal Vane to produce an equalized output voltage signal Vo.

As also stated above, each length of transmission line can be characterized by a transfer function which mathematically represents the frequency response of that length of transmission line. Boost stage 12 compensates the input voltage signal Vi for the maximum length of transmission line by circuitry, described in greater below, which mathematically represents the inverse transfer function of the frequency response of the maximum length of transmission line. By utilizing the inverse transfer function of the maximum length of transmission line, boost stage 12 recovers substantially all of the frequency components which are attenuated by the maximum length of transmission line.

In the present invention, the gain G1 of first variable gain stage 14 and the gain G2 of second variable gain stage 16 are inversely related so that the total gain Gt of adaptive equalization circuit 10 can be mathematically defined as:

$$G_t = G1 + G2 = 1.$$

Thus, when two local area network devices are connected by the maximum length of transmission line, adaptive equalization circuit 10 compensates for the frequency attenuation of the input signal Vi by increasing the gain G1 of the first variable gain stage 14 via the first gain control signal Vfg and by reducing the gain G2 of the second variable gain stage 16 via the second gain control signal Vsg so that the equalized output signal Vo is substantially formed by only the amplified equalized signal Vae.

In contrast, it can be assumed that substantially no frequency attenuation is associated with a minimum length of transmission line. Thus, there is no need to compensate the input signal Vi when the minimum length of transmission line is utilized. Therefore, when two local area network devices are connected by the minimum length of transmission line, the gain G1 of the first variable gain stage 14 is reduced via the first gain control signal Vfg while the gain G2 of the second variable gain stage 16 is increased via the second gain control signal Vsg so that the equalized output signal Vo is substantially formed by only the amplified unequalized signal Vane.

When two local area network devices are connected by an intermediate length of transmission line, adaptive equalization circuit 10 compensates for the frequency attenuation associated with the intermediate length of transmission line by combining a portion of the amplified equalized signal Vae and a portion of the amplified unequalized signal Vane.

In operation, the portion of the amplified equalized signal Vae and the portion of the amplified unequalized signal Vane are selected by varying the gain G1 of the first variable gain stage 14 via the first gain control signal Vfg while inversely varying the gain G2 of the second variable gain stage 16 via the second gain control signal Vsg, respectively. Thus, the waveshape of the output voltage signal Vo can be modified to compensate for any intermediate length of transmission line by varying the proportions of the amplified equalized signal Vae and the amplified unequalized signal Vane which are combined to form the equalized output signal Vo.

Figure 8:
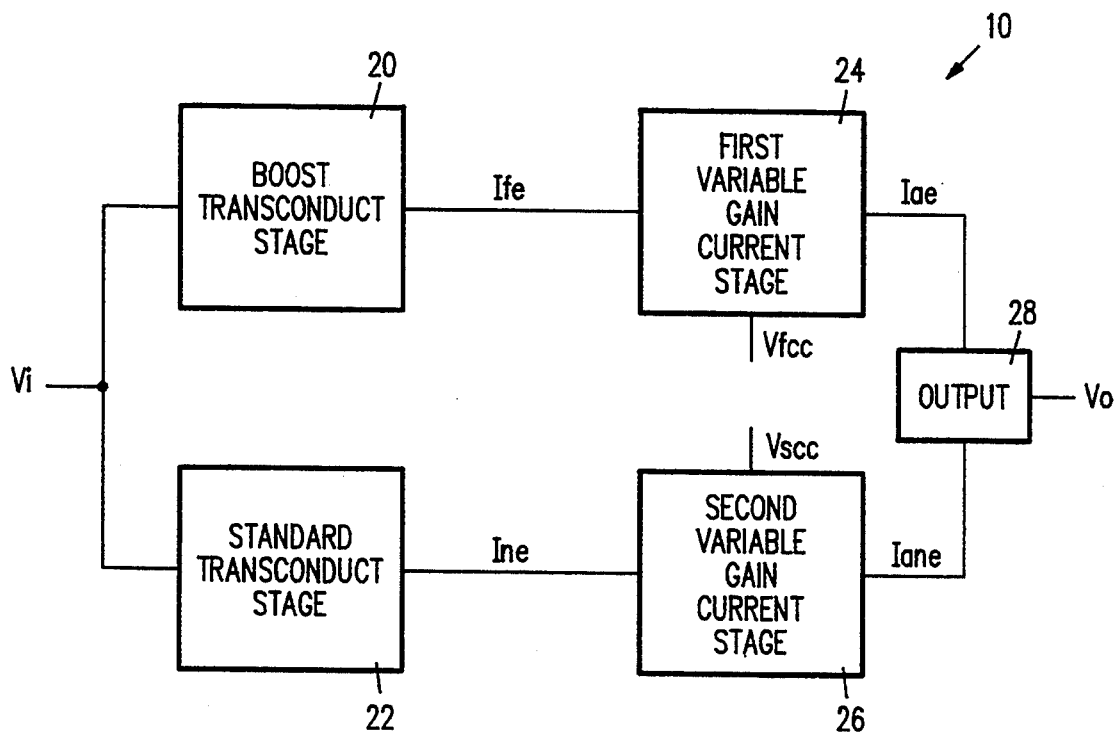
FIG. 8 is a block diagram illustrating an embodiment of adaptive equalization circuit which utilizes a resistor-capacitor network in accordance with the present invention.

Boost circuit 12 can be implemented using either a resistor-capacitor network, which transforms the input voltage signal Vi into a current signal, or a precision delay network. FIG. 8 shows a block diagram of an embodiment of adaptive equalization circuit 10 which utilizes the resistor-capacitor network in accordance with the present invention.

As shown in FIG. 8, adaptive equalization circuit 10 includes a boost transconductance stage 20 that generates a fully equalized current signal Ifs in response to the input voltage signal Vi by compensating the input voltage signal Vi for the frequency attenuation associated with the maximum length of transmission line. A standard transconductance stage 22 generates a unequalized current signal Ins in response to the input voltage signal Vi. A first variable gain current stage 24 amplifies the fully equalized current signal Ifs to produce an amplified equalized current signal Iae in response to a first current control signal Vfcc. A second variable gain current stage 26 amplifies the unequalized current signal Ins to produce an amplified unequalized current signal Iane in response to a second current control signal Vscc. An output stage 28 combines the amplified equalized current signal Iae and the amplified unequalized current signal Iane to produce an output current (not shown in FIG. 8) and generates the equalized output voltage signal Vo in response to the output current.

In the FIG. 8 embodiment, as with the FIG. 7 embodiment, the gain of first variable gain current stage 24 and the gain of second variable gain stage 26 are inversely related so that the total gain is equivalent to one. Thus, when two local area network devices are connected by the maximum length of transmission line, adaptive equalization circuit 10 compensates for the frequency attenuation of the input signal Vi by increasing the gain of the first variable gain current stage 24 via the first current control signal Vfcc and by reducing the gain of the second variable gain current stage 26 via the second current control signal Vscc so that the output current is substantially formed by only the amplified equalized current signal Iae.

Similarly, when two local area network devices are connected by the minimum length of transmission line, the gain of the first variable gain current stage 24 is reduced via the first current control signal Vfcc while the gain of the second variable gain current stage 26 is increased via the second current control signal Vscc so that the output current is substantially formed by only the amplified unequalized current signal Iane.

Further, when two local area network devices are connected by the intermediate length of transmission line, adaptive equalization circuit 10 compensates for the frequency attenuation associated with the intermediate length of transmission line by combining a portion of the amplified equalized current signal Iae and a portion of the amplified unequalized current signal Iane.

Figure 9:
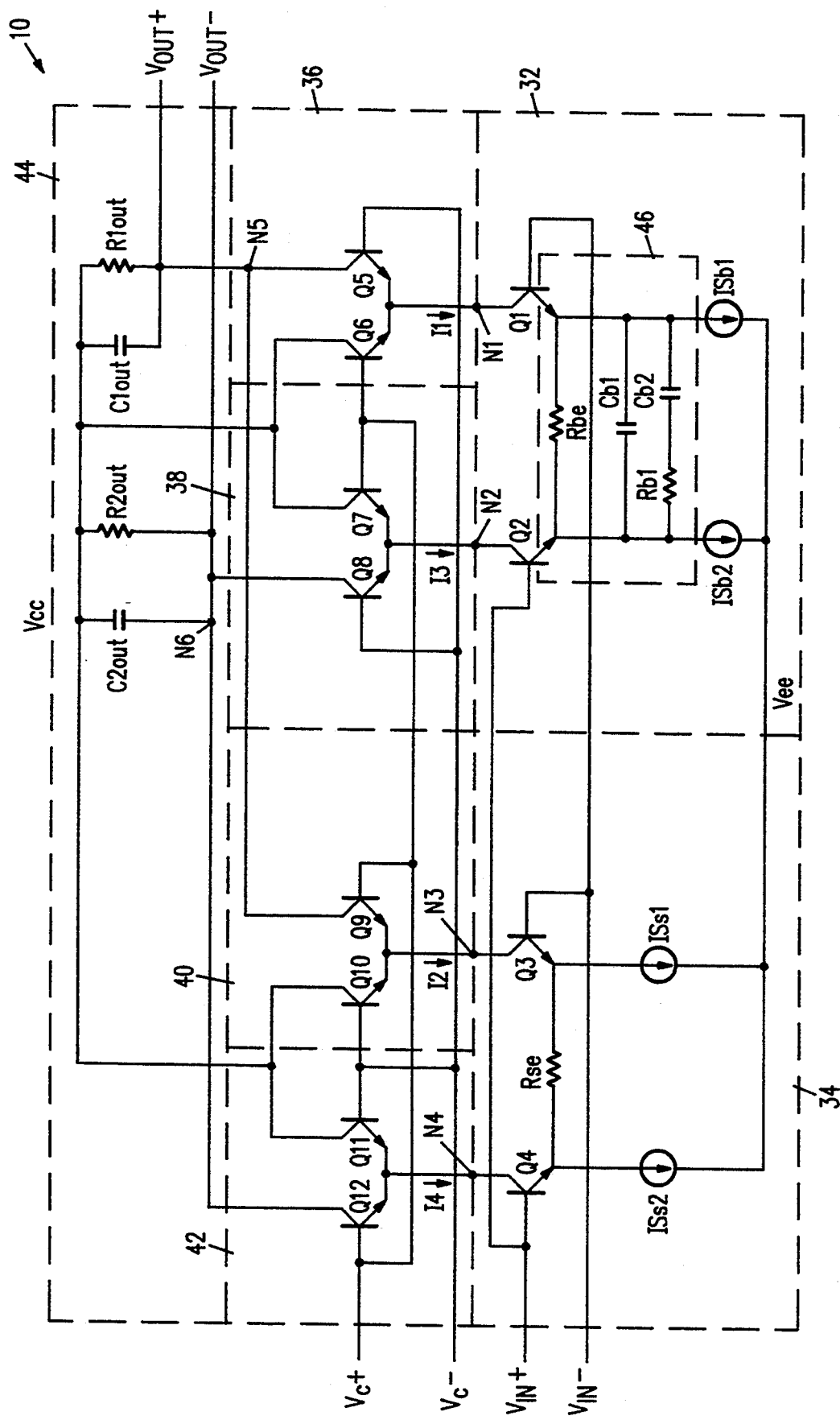
FIG. 9 is a schematic diagram illustrating an implementation of the FIG. 8 embodiment of adaptive equalization circuit.

FIG. 9 shows a schematic diagram of an implementation of the FIG. 8 embodiment of adaptive equalization circuit 10. In the FIG. 9 embodiment, adaptive equalization circuit 10 receives a pair of complementary input voltage signals Vin+/−, such as twisted pair signals, and generates a pair of complementary equalized output signals Vout+/− in response to a pair of complementary control signals vc+/−.

As shown in FIG. 9, adaptive equalization circuit 10 includes a boost degenerated common emitter differential pair input stage 32, which corresponds to boost transconductance stage 20. A standard degenerated common emitter differential pair input stage 34 corresponds to standard transconductance stage 22. A first current steering differential pair 36 and a second current steering differential pair 38 correspond to first variable gain current stage 24. A third current steering differential pair 40 and a fourth current steering differential pair 42 corresponds to second variable gain current stage 26. A passive output stage 44 corresponds to output stage 28.

As shown in FIG. 9, boost differential pair 32 includes a first boost transistor Q1, a second boost transistor Q2, and a waveshaping stage 46. First boost transistor Q1 has its base connected to the negative input signal Vin− of the pair of complementary input signals Vin+/−, its collector connected to a first node N1, and its emitter connected to a voltage potential Vee via a first boost current source ISb1. Second boost transistor Q2 has its base connected to the positive input signal Vin+ of the pair of complementary input signals Vin+/−, its collector connected to a second node N2, and its emitter connected to potential Vee via a second boost current source ISb2. The waveshaping stage 46 includes a boost emitter resistor Rbe, a first boost capacitor Cb1, and a series connection of a first boost resistor Rb1 and a second boost capacitor Cb2, each of which is connected between the emitter of the first boost transistor Q1 and the emitter of the second boost transistor Q2.

Standard differential pair 34 includes a first standard transistor Q3, a second standard transistor Q4, and a standard emitter resistor Rse. First standard transistor Q3 has its base connected to the negative input signal Vin− of the pair of complementary input signals Vin+/−, its collector connected to a third node N3, and its emitter connected to potential Yes via a first standard current source ISs1. Second standard transistor Q4 has its base connected to the positive input signal Vin+ of the pair of complementary input signals Vin+/−, its collector connected to a fourth node N4, and its emitter connected to potential Yes via a second standard current source ISs2. Standard emitter resistor Rse is connected between the emitter of the first standard transistor Q3 and the emitter of the second standard transistor Q4.

The first current steering differential pair 36 includes a first steering transistor Q5 and a second steering transistor Q6. First steering transistor Q5 has its base connected to the negative control signal Vc− of the pair of complementary control signals Vc+/−, its collector connected to a fifth node N5, and its emitter connected to the first node N1. Second steering transistor Q6 has its base connected to the positive control signal Vc+ of the pair of complementary input signals Vc+/−, its collector connected to a power supply Vcc, and its emitter connected to the first node N1.

The second current steering differential pair 38 includes a third steering transistor Q7 and a fourth steering transistor Q8. Third steering transistor Q7 has its base connected to the positive control signal Vc+ of the pair of complementary control signals Vc+/−, its collector connected to the power supply Vcc, and its emitter connected to the second node N2. Fourth steering transistor Q8 has its base connected to the negative control signal Vin− of the pair of complementary input signals Vin+/−, its collector connected to a sixth node N6, and its emitter connected to the second node N2.

Third current steering differential pair 40 includes a fifth steering transistor Q9 and a sixth steering transistor Q10. Fifth steering transistor Q9 has its base connected to the positive control signal Vc+ of the pair of complementary control signals Vc+/−, its collector connected to the fifth node N5, and its emitter connected to the third node N3. Sixth steering transistor Q10 has its base connected to the negative control signal Vin− of the pair of complementary input signals Vin+/−, its collector connected to the power supply Vcc, and its emitter connected to the third node N3.

Fourth current steering differential pair 42 includes an seventh steering transistor Q11 and an eighth steering transistor Q12. Seventh steering transistor Q11 has its base connected to the negative control signal Vc− of the pair of complementary control signals Vc+/−, its collector connected to the power supply Vcc, and its emitter connected to the fourth node N4. Eighth steering transistor Q12 has its base connected to the positive control signal Vin+ of the pair of complementary input signals Vin+/−, its collector connected to the sixth node N6, and its emitter connected to the fourth node N4. The pair of complementary output signals Vout+/− are taken from the fifth node N5 and the sixth node N6, respectively.

Passive output stage 44 includes a first output resistor R1out and a first output capacitor C1out, which are both connected between the power supply Vcc and the fifth node N5. A second output resistor R2out and a second output capacitor C2out are both connected between the power supply Vcc and the sixth node N6. The combination of first output resistor R1out and first output capacitor C1out and the combination of second output resistor R2out and second output capacitor C2out form an output pole which limits the bandwidth of circuit 10 to a predetermined frequency. By limiting the bandwidth, noise and other well-known effects resulting from excessive bandwidth can be minimized. In addition, the output pole helps compensate for a parasitic zero which is caused by the parasitic capacitances to ground which result from practical integrated circuit implementations of the capacitor Cb1.

In operation, when two local area network devices are connected by the maximum length of transmission line, an external control circuit (not shown in FIG. 9) drives the negative control voltage Vc− high and simultaneously drives the positive control voltage Vc+ low, thereby maximizing the transconductance of first steering transistor Q5, fourth steering transistor QS, sixth steering transistor Q10, and seventh steering transistor Q11, and minimizing the transconductance of second steering transistor Q6, third steering transistor Q7, fifth steering transistor Q9, and eighth steering transistor Q12.

Thus, when the negative input signal Vin− is driven high, first boost transistor Q1 and first standard transistor Q3 increase their conductance. In response, first boost transistor Q1 sinks a first current I1 through first output resistor R1out and first steering transistor Q5, thereby reducing the voltage of the positive complementary output voltage Vout+. First standard transistor Q3, however, sinks a second current I2 through sixth steering transistor Q10. Since the collector of sixth steering transistor Q10 is connected to the power supply Vcc, the second current I2 sunk by first standard transistor Q3 does not effect the voltage of the positive complementary output voltage Vout+. Thus, when a maximum length of transmission line is utilized, the positive complementary output signal Vout+ results only from the first current I1 sunk through the first boost transistor Q1.

When the negative input signal Vin− is driven high, the positive input signal Vin+ is simultaneously driven low, thereby reducing second boost transistor Q2 and second standard transistor Q4 conductances. In response, second boost transistor Q2 reduces its sinking of third current I3 through second output resistor R2out and fourth steering transistor QS, thereby increasing the voltage of the negative complementary output voltage Vout−. In addition, second standard transistor Q4 reduces its sinking of fourth current I4 through seventh steering transistor Q11. Since the collector of seventh steering transistor Q11 is connected to the power supply Vcc, the fourth current I4 does not effect the voltage of the negative output signal Vout−.

Similarly, when the positive input signal Vin+ is driven high, second boost transistor Q2 and second standard transistor Q4 increase their conductance. In response, second boost transistor Q2 sinks the third current I3 through second output resistor R2out and fourth steering transistor QS, thereby reducing the voltage of the negative complementary output voltage Vout−. Second standard transistor Q4, however, sinks a fourth current I4 through seventh steering transistor Q11. Since the collector of seventh steering transistor Q11 is connected to the power supply Vcc, the fourth current I4 sunk by second standard transistor Q4 does not effect the voltage of the negative complementary output voltage Vout−. Thus, when a maximum length of transmission line is utilized, the negative complementary output signal Vout− results only from the second current I2 sunk through the second boost transistor Q2.

When the positive input signal Vin+ is driven high, the negative input signal Vin− is simultaneously driven low, thereby reducing first boost transistor Q1 and first standard transistor Q3 conductances. In response, first boost transistor Q1 reduces its sinking of first current I1 through first output resistor R1out and first steering transistor Q5, thereby increasing the voltage of the positive output voltage Vout+.

Thus, when the maximum length of transmission line is utilized, the pair of complementary output signals Vout+/− result only from the first current I1, which is sunk through first boost transistor Q1, and the third current I3, which is sunk through the second boost transistor Q2.

Figure 1:
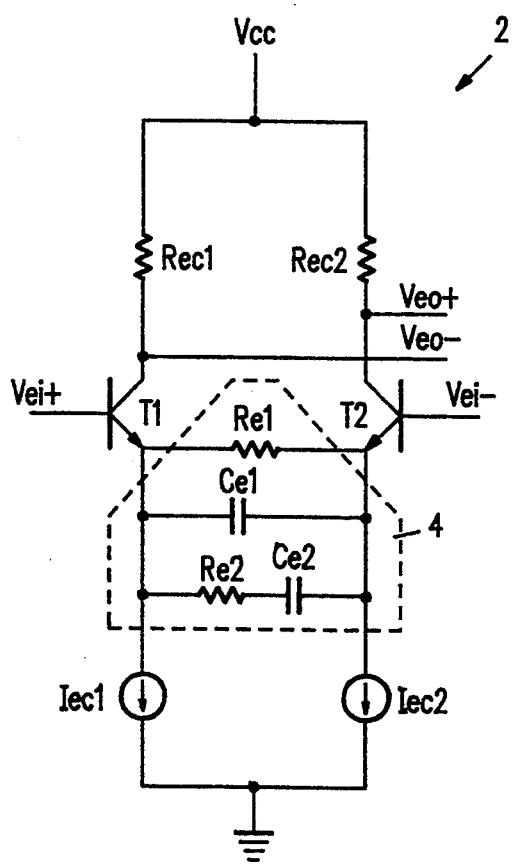
FIG. 1 is a schematic diagram illustrating a conventional equalization amplifier.
Figure 2:
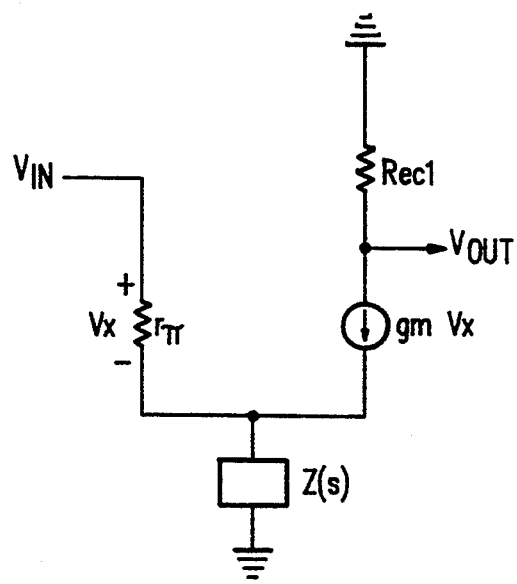
FIG. 2 shows a simplified, medium-frequency, small-signal circuit diagram which is equivalent to one-half of the differential pair illustrated in FIG. 1.
Figure 3:
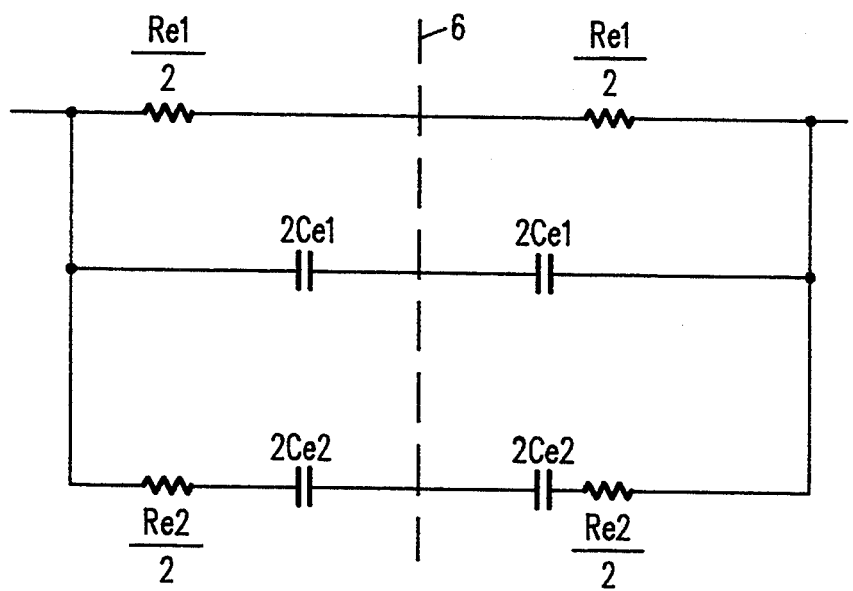
FIG. 3 shows a point of symmetry circuit diagram which is equivalent to inverse transfer function generator 4 of FIG. 1.
Figure 4:
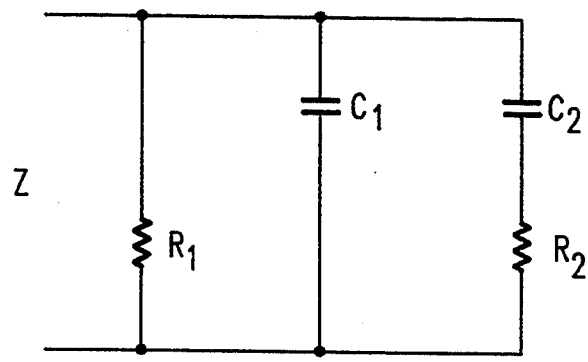
FIG. 4 shows a circuit diagram illustrating one side of the FIG. 3 circuit.
Figure 5:
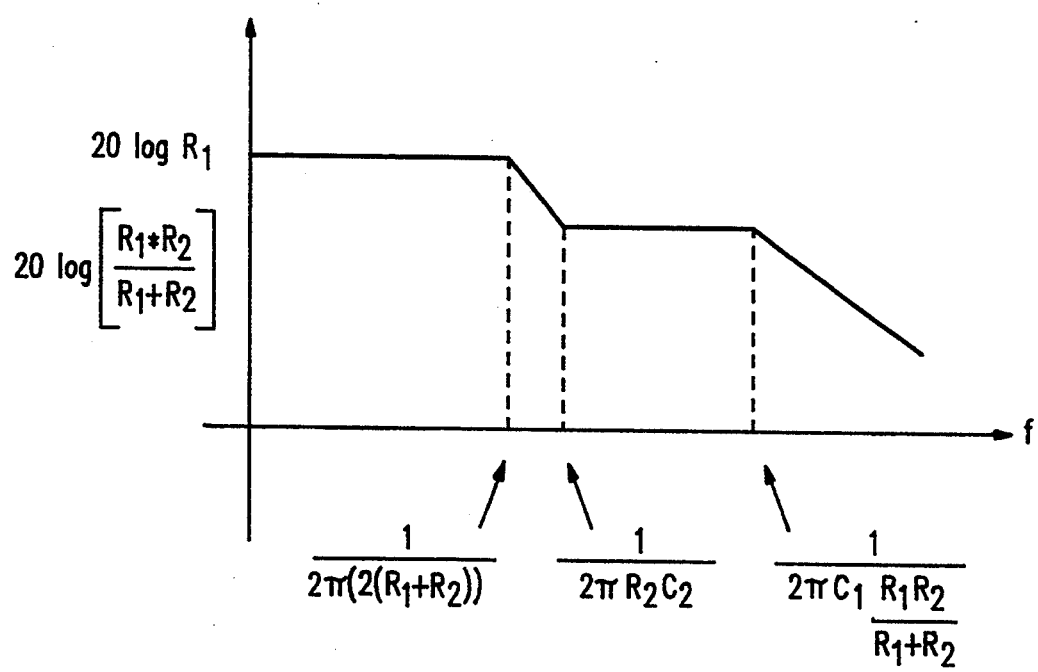
FIG. 5 shows the magnitude of an impedance versus frequency plot.
Figure 6:
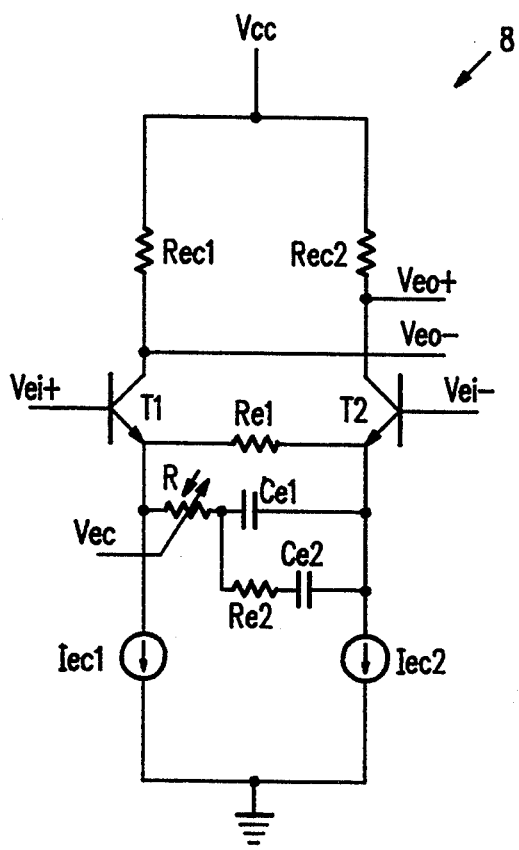
FIG. 6 shows an equalization amplifier 8 illustrating the equalization amplifier of FIG. 1 with a variable resistor Rv.

First boost transistor Q1 and second boost transistor Q2 are biased by current sources Isb1 and Isb2, respectively, and collector load resistors R1out and R2out, respectively, for linear operation as a differential amplifier. Readers will recognize that waveshaping stage 46 is identical to inverse transfer function generator 4 of FIG. 1. Thus, as previously shown, the transfer function can be described by substituting EQ. C into EQ. A. Using the component variables from FIG. 9, the transfer function can be described by:

$$Vout/Vin \approx \frac{-(R1out + R2out)(1 + s\tau_{z1})(1 + s\tau_{z2})}{Rbe \quad (1 + s\tau_{p1})}$$

where $\tau_{z1} = Cb2(Rbe+Rb1)$, $\tau_{z2} = Cb1 \cdot Rbe \cdot Rb1/Rbe+Rb1$, and $\tau_{p1} = (Rb1)(Cb2)$.

This creates a transconductance with a pole-zero pair and a second zero. By correctly positioning the single pole and the two zeros, a good approximation of the inverse transfer function of the maximum length of transmission line can be created.

As described, boost emitter resistor Rbe, first boost resistor Rb1, first boost capacitor Cb1, and second boost capacitor Cb2 form a second order resistor-capacitor network. Experimental results show that a second order network provides sufficient compensation for a category 5 unshielded twisted pair transmission line of up to 100 meters in length carrying a scrambled 125 MHz clocked data stream. Alternately, in accordance with the present invention, a higher order resistor-capacitor network can be formed for transmission lines in excess of 100 meters by adding additional capacitances in parallel with boost emitter resistor Rbe.

Figure 10:
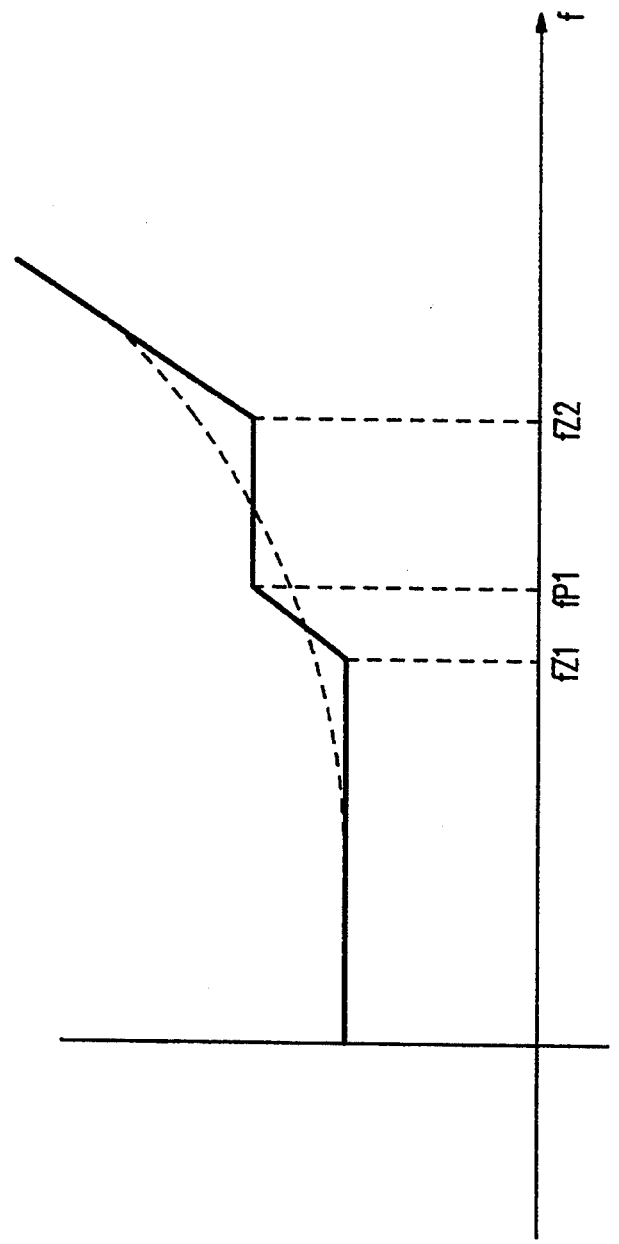
FIG. 10 is a Bode plot illustrating the magnitude response resulting from boost emitter resistor Rbe, first boost resistor Rb1, first boost capacitor Cb1, and second boost capacitor Cb2.

FIG. 10 shows a Bode plot of the magnitude response resulting from boost emitter resistor Rbe, first boost resistor Rb1, first boost capacitor Cb1, and second boost capacitor Cb2 in the FIG. 9 circuit. As shown in FIG. 10, boost emitter resistor Rbe, first boost resistor Rb1, first boost capacitor Cb1, and second boost capacitor Cb2 create a first breakpoint fZ1 which corresponds to the first zero, a second breakpoint fP1 which corresponds to the first pole, and a third breakpoint fZ2 which corresponds to the second zero.

The first breakpoint fZ1 can be mathematically described as:

$$f_{Z1} = \frac{1}{2\pi(Cb2)(Rbe + Rb1)}.$$

The second breakpoint fP1 can be mathematically described as:

$$f_{P1} = \frac{1}{2\pi(Cb2)(Rb1)}.$$

The third breakpoint fZ2 can be mathematically described as:

$$f_{Z2} = \frac{1}{2\pi(Cb1)\left[\frac{(Rbe)(Rb1)}{(Rbe + Rb1)}\right]}.$$

As stated above, when first boost transistor Q1 sinks the first current I1, second boost current source ISb2 creates the voltage drop across boost emitter resistor Rbe. Similarly, when second boost transistor Q2 sinks the third current I3, first boost current source ISb1 creates the voltage drop across boost emitter resistor Rbe.

Pulling the first current I1 and the third current I3 through boost emitter resistor Rbe is a well-known method for providing negative feedback current which reduces the direct current or low-frequency gain, but increases the linearity of the transfer characteristic.

The direct current or low-frequency gain $G_{dc}$ of both first current steering differential pair 36 and second current steering differential pair 38 can be mathematically described as:

$$G_{dc} = \frac{2(R1out)}{Rbe}.$$

Referring again to FIG. 9, when two local area network devices are connected by the minimum length of transmission line, the external control circuit drives the negative control voltage Vc− low and simultaneously drives the positive control voltage Vc+ high, thereby minimizing first steering transistor Q5, fourth steering transistor QS, sixth steering transistor Q10, and seventh steering transistor Q11 transconductances, and maximizing second steering transistor Q6, third steering transistor Q7, fifth steering transistor Q9, and eighth steering transistor Q12 transconductances.

Thus, when the negative input signal Vin− is driven high, first boost transistor Q1 and first standard transistor Q3 increase their conductance. In response, first boost transistor Q1 sinks the first current I1 through second steering transistor Q6. Since the collector of second steering transistor Q6 is connected to the power supply Vcc, the first current I1 sunk by first boost transistor. Q1 does not effect the voltage of the positive output signal Vout+. First standard transistor Q3, however, sinks the second current I2 through first output resistor R1out and fifth steering transistor Q9, thereby reducing the voltage of the positive output voltage Vout+. Thus, when a minimum length of transmission line is utilized, the positive output signal Vout+ results only from the second current I2 sunk through the first standard transistor Q3.

When the negative input signal Vin− is driven high, the positive input signal Vin+ is simultaneously driven low, thereby reducing second boost transistor Q2 and second standard transistor Q4 conductances. In response, second boost transistor Q2 reduces its sinking of third current I3 through third steering transistor Q7. Since the collector of third steering transistor Q7 is connected to the power supply Vcc, the third current I3 does not effect the voltage of the negative output signal Vout−. In addition, second standard transistor Q4 reduces its sinking of fourth current I4 through second output resistor R2out and eighth steering transistor Q12, thereby increasing the voltage of the negative output signal Vout−.

Similarly, when the positive input signal Vin+ is driven high, second boost transistor Q2 and second standard transistor Q4 increase their conductance. In response, second boost transistor Q2 sinks the third current I3 through third steering transistor Q7. Since the collector of third steering transistor Q7 is connected to the power supply Vcc, the third current I3 sunk by second boost transistor Q2 does not effect the voltage of the negative output signal Vout−. Second standard transistor Q4, however, sinks the fourth current I4 through second output resistor R2out and eighth steering transistor Q12, thereby reducing the voltage of the negative output voltage Vout−. Thus, when a minimum length of transmission line is utilized, the negative output signal Vout− results only from the fourth current I4 sunk through the second standard transistor Q4.

When the positive input signal Vin+ driven high, the negative input signal Vin− is simultaneously driven low, thereby reducing first boost transistor Q1 and first standard transistor Q3 conductances. In response, first boost transistor Q1 reduces its sinking of first current I1 through second steering transistor Q6 and first standard transistor Q3 reduces its sinking of second current I2 through sixth steering transistor Q10.

Thus, when the minimum length of transmission line is utilized, the complementary pair of output signals Vout+/− result only from the second current I2 sunk through the first standard transistor Q3 and the fourth current I4 sunk through the second standard transistor Q4.

When first standard transistor Q3 sinks the second current I2, both first standard current source ISs1 and second standard current source ISs2 sink an equivalent portion of the second current I2. Thus, by sinking an equivalent portion of the second current I2, second standard current source ISs2 creates a voltage drop across standard emitter resistor Rse. Similarly, when second standard transistor Q4 sinks the fourth current I4, both first standard current source ISs1 and second standard current source ISs2 sink an equivalent portion of the fourth current I4. Thus, by sinking an equivalent portion of the fourth current I4, first standard current source ISs1 creates the voltage drop across standard emitter resistor Rse.

As with the first and third currents I1 and I3, pulling the second current I2 and the fourth current I4 through standard emitter resistor Rse is a wellknown method for providing negative feedback current which reduces the direct current or low-frequency gain, but increases the linearity of the transfer characteristic.

The direct current or low-frequency gain $G_{dc}$ of both third current steering differential pair 40 and fourth current steering differential pair 42 can be mathematically described as:

$$G_t = \frac{-2(R2out)}{Rse}.$$

When two local area network devices are connected by an intermediate length of transmission line, a portion of both the first current I1 and the second current I2 are sunk through first output resistor R1out while an equivalent portion of both the third current I3 and the fourth current I4 are sunk through second output resistor R2out.

For example, assume that the intermediate length of transmission line can be compensated for by sinking 70% of the first current I1 and 30% of the second current I2 through first output resistor R1out and by sinking 70% of the third current I3 and 30% of the fourth current I4 through second output resistor R2out.

The external control circuit sets the pair of complementary control signals Vc+/− so that each steering transistor Q5, Q6, Q7, QS, Q9, and Q10 enters the linear region of operation, thereby partially turning on. In this example, the external control circuit partially turns on first steering transistor Q5, fourth steering transistor QS, sixth steering transistor Q10, and seventh steering transistor Q11 by setting the negative control voltage Vc− at a voltage which corresponds to a current flow which is approximately 70% of the total available bias current.

Similarly, the external control circuit partially turns on second steering transistor Q6, third steering transistor Q7, fifth steering transistor Q9, and eighth steering transistor Q12 by setting the positive control voltage Vc+ at a voltage which corresponds to a current flow which is approximately 30% of the total available bias current.

Thus, when the negative input signal Vin− is driven high, first boost transistor Q1 sinks 70% of the first current I1 through first output resistor R1out and first steering transistor Q5 and 30% of the first current I1 through second steering transistor Q6 while first standard transistor Q3 sinks 30% of the second current I2 through first output resistor R1out and fifth steering transistor Q9 and 70% of the second current I2 through sixth steering transistor Q10.

Since 30% of the first current I1 is sunk through second steering transistor Q6 and 70% of the second current I2 is sunk through sixth steering transistor Q10 while 30% of the third current I3 is sunk through third steering transistor Q7 and 70% of the fourth current I4 is sunk through seventh steering transistor Q11, these portions of the current have no effect on the pair of complementary output signals Vout+/−. Thus, when an intermediate length of transmission line is utilized, the positive output signal Vout+ is generated by a portion of both the first current I1 and the second current I2 while the negative output signal Vout− is generated by a portion of both the third current I3 and the fourth current I4.

Similarly, when the positive input signal Vin+ is driven high, second boost transistor Q2 sinks 70% of the third current I3 through second output resistor R2out and fourth steering transistor Q8 and 30% of the third current I3 through third steering transistor Q7 while second standard transistor Q4 sinks 30% of the fourth current I4 through second output resistor R2out and eighth steering transistor Q12 and 70% of the fourth current I4 through seventh steering transistor Q11. Thus, when an intermediate length of transmission line is utilized, the negative output signal Vout− is generated by a portion of both the third current I3 and the fourth current I4.

By controlling the amount of the first and third currents I1 and I3, respectively, and by inversely controlling the amount of the second and fourth currents I2 and I4, respectively, the current steering pairs Q5/Q6, Q7/QS, Q9/Q10, and Q11/Q12 can vary the effective equalization from zero to a maximum. Experimental results have shown that the transition between extremes can be relatively linear if the external control circuit is a well-known DC bias circuit which compresses the actual variable into a logarithmic differential control voltage.

Experimental results have also shown that the present invention can provide a relatively linear transition between 0 dB and 17 dB at the peak data frequency of 62.5 MHz (based on a 125 MHz transmit clock signal and a fixed pole at or above 156 MHz). Further, the present invention can provide equal peak amplitudes for all pulse widths and multiple line lengths.

In the preferred embodiment of the present invention, due to voltage headroom limitations (Vcc=5.0+/−10%) and to maintain bandwidth without excessive power, adaptive equalization circuit 10 provides a gain of −6 dB. Adaptive equalization circuit 10 can be followed by a 6 dB fixed gain stage to provide 0 dB overall gain prior to quantization of the data levels by subsequent receiver circuitry.

Figure 11:
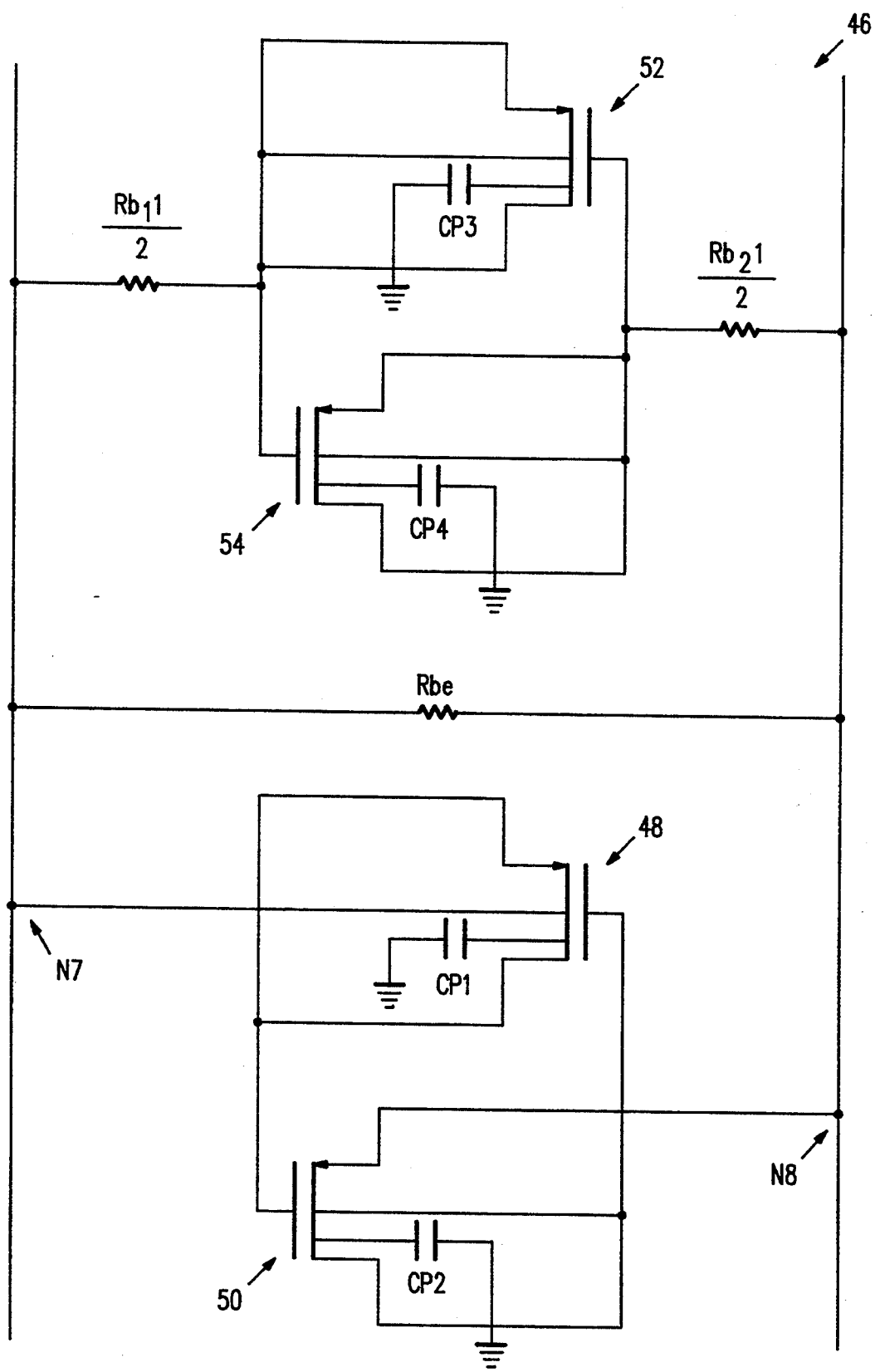
FIG. 11 shows a schematic of waveshaping stage 46 illustrating the implementation of capacitor Cb1 as a first PMOS transistor 48 and a second PMOS transistor 50 and the implementation of capacitor CB2 as a third PMOS transistor 52 and a fourth PMOS transistor 54.

FIG. 11 shows a schematic of waveshaping stage 46 illustrating the implementation of capacitor Cb1 as a first PMOS transistor 48 and a second PMOS transistor 50 and the implementation of capacitor CB2 as a third PMOS transistor 52 and a fourth PMOS transistor 54. As shown in FIG. 11, the source, body, and drain of first PMOS transistor 48 and the gate of second PMOS transistor 50 are connected to a seventh node N7, which corresponds to the emitter of second boost transistor Q2, while the source, body, and drain of second PMOS transistor 50 and the gate of first PMOS transistor 48 are connected to an eighth node NS, which corresponds to the emitter of first boost transistor Q1.

Although it is well-known that a capacitor can be formed from a single MOS transistor, where the first capacitor plate is represented by the gate and the second capacitor plate is represented by the connection of the source, body, and drain, a capacitor formed in this manner also includes a parasitic capacitance between the source, body, and drain connection and ground which can account for up to 20% of the total capacitance. Thus, first transistor 48, second transistor 50, third transistor 52, and fourth transistor 54 have parasitic capacitances CP1, CP2, CP3, and CP4, respectively.

The parasitic capacitance provides the second capacitor plate, formed from the source, body, and drain connection, with a high-frequency path to ground which is not present in the first capacitor plate. By providing a parasitic capacitance of up to 20% on one plate and nothing on the other, the frequency response at the seventh node N7 will be different from the frequency response of the eighth node NS. In addition, as the voltage varies on either the first or second plate, the capacitance of a MOS implemented capacitor also varies.

By connecting first PMOS transistor 48 and second PMOS transistor 50 in parallel and in opposite polarity, as shown in FIG. 11, the parasitic capacitance can be introduced to both the seventh node N7 and the eighth node NS, which, to a first order, balances the effect of the parasitic capacitance.

In addition, as the capacitance of one PMOS transistor varies due to a varying voltage, the capacitance on the other PMOS transistor inversely varies. Thus, for example, when the voltage on the gate of first PMOS transistor 48 increases, the capacitance of transistor 48 decreases. However, the corresponding decrease in voltage seen by the gate of second PMOS transistor 50 increases the capacitance of transistor 50. This again, to a first order, balances the effect of the varying capacitance resulting from a varying voltage.

Similarly, as further shown in FIG. 11, the source, body, and drain of third PMOS transistor 52 and the gate of fourth PMOS transistor 54 are connected to the seventh node N7 through first half resistor $Rb_1 1/2$, while the source, body, and drain of fourth PMOS transistor 54 and the gate of third PMOS transistor 52 are connected to the eighth node N8 through second half resistor $Rb_2 1/2$. Resistor Rb1 is divided equally into first half resistor $Rb_1 1/2$ and second half resistor $Rb_2 1/2$ to maintain symmetry.

In addition, although the present invention utilizes a pair of PMOS transistors to implement a frequency-response balanced capacitor, the same concept can be applied to NMOS transistors.

It should be understood that various alternatives to the structures described herein may be employed in practicing the present invention. It is intended that the following claims define the invention and that structures within the scope of these claims and their equivalents be covered thereby.

What is claimed is:

1. An adaptive equalization circuit for equalizing the frequency response of varying lengths of transmission line, the adaptive equalization circuit comprising:
    a boost transconductance stage that responds to an input voltage signal provided on a transmission line by compensating for the frequency attenuation associated with maximum length of transmission line to produce an equalized current signal, the boost transconductance stage including;
        a first boost transistor having a base connected to a first input signal of a pair of complementary input signals, a collector connected to a first node, and an emitter connected to a common node by a first current source,
        a second boost transistor having a base connected to a second input signal of the pair of complementary input signals, a collector connected to a second node, and an emitter connected to the common node by a second current source, and
        a plurality of waveshaping components, connected between the emitter of the first boost transistor and the emitter of the second boost transistor;
    a standard transconductance stage that generates an unequalized current signal in response to the input voltage signal;
    a first variable gain current stage that amplifies the equalized current Signal to produce an amplified equalized current signal in response to a first current control signal;
    a second variable gain current stage that amplifies the unequalized current signal to produce an amplified unequalized current signal in response to a second current control signal; and
    an output stage that combines the amplified equalized current signal and the amplified unequalized current signal to produce an output current and that generates an equalized output signal in response to the output current,
    wherein, when the maximum length of transmission line is utilized, the first current control signal increases the gain of the first variable gain current stage while the second current control signal reduces the gain of the second variable gain current stage so that the output current is substantially formed by only the amplified equalized current, and
    wherein, when a minimum length of transmission line is utilized, the first current control signal reduces the gain of the first variable gain current stage while the second current control signal increases the gain of the second variable gain current stage so that the output current is substantially formed by only the amplified unequalized current, and
    wherein, when an intermediate length of transmission line is utilized, the first current control Signal varies the gain of the first variable gain current stage and the second current control inversely varies the gain of the second variable gain current stage so that the output current is formed by combining a portion of both the amplified equalized current and the amplified unequalized current.

2. The circuit of claim 1 wherein the standard transconductance stage includes a standard degenerated common emitter differential pair, the standard differential pair including a first standard transistor, a second standard transistor, and a standard emitter resistor, the first standard transistor having a base connected to the first input signal, a collector connected to a third node, and an emitter connected to a common node by a third current source, the second boost transistor having a base connected to a second input signal, a collector connected to a fourth node, and an emitter connected to the common node by a fourth current source, the standard emitter resistor connected between the emitter of the first standard transistor and the emitter of the second standard transistor.

3. The circuit of claim 2 wherein the first variable gain current stage includes a first current steering differential pair and a second current steering differential pair, the first current steering differential pair having a first steering transistor and a second steering transistor, the second current steering differential pair having a third steering transistor and a fourth steering transistor.

4. The circuit of claim 3 wherein the first steering transistor has a base connected to a first control signal of a pair of complementary control signals, a collector connected to a fifth node, and an emitter connected to the first node and wherein the second steering transistor has a base connected to a second control signal of the pair of complementary control signals, a collector connected to a power supply node, and an emitter connected to the first node.

5. The circuit of claim 4 wherein the third steering transistor has a base connected to the second control signal, a collector connected to the power supply node, and an emitter connected to the second node and wherein the fourth steering transistor has a base connected to the first control signal, a collector connected to a sixth node, and an emitter connected to the second node.

6. The circuit of claim 5 wherein the second variable gain current stage includes a third current steering differential pair and a fourth current steering differential pair, the third current steering differential pair having a fifth steering transistor and a sixth steering transistor, the fourth current steering differential pair having a seventh steering transistor and an eighth steering transistor.

7. The circuit of claim 6 wherein the fifth steering transistor has a base connected to the second control signal, a collector connected to a fifth node, and an emitter connected to the third node and wherein the sixth steering transistor has a base connected to a first control signal, a collector connected to the power supply node, and an emitter connected to the third node.

8. The circuit of claim 7 wherein the seventh steering transistor has a base connected to the first control signal, a collector connected to the power supply node, and an emitter connected to the fourth node and wherein the eighth steering transistor has a base connected to the second control signal, a collector connected to a sixth node, and an emitter connected to the fourth node.

9. The circuit of claim 8 wherein the output stage includes a first output resistor and a first output capacitor connected between the power supply node and the fifth node and a second output resistor and a second output capacitor connected between the power supply node and the sixth node,
wherein a first output signal of a pair of complementary output signals is taken from the fifth node and a second output signal of the pair of complementary output signals is taken from the sixth node.

10. The circuit of claim 9 wherein the plurality of waveshaping components includes a boost emitter resistor, a first boost capacitor, and a series connected first boost resistor and a second boost capacitor.

11. The circuit of claim 9 wherein the plurality of waveshaping components comprises:
a boost emitter resistor connected between the emitter of the first boost transistor and the emitter of the second boost transistor;
a first MOS transistor having a first gate, a first source, a first drain, and a first body, the first gate connected to the emitter of the first boost transistor, the first source, the first drain, and the first body being connected to the emitter of the second boost transistor;
a second MOS transistor having a second gate, a second source, a second drain, and a second body, the second gate connected to the emitter of the second boost transistor, the second source, the second drain, and the second body being connected to the emitter of the first boost transistor;
a first half first boost resistor;
a second half first boost resistor;
a third MOS transistor having a third gate, a third source, a third drain, and a third body, the third gate being connected to the emitter of the first boost transistor through the first half first boost resistor, the third source, the third drain, and the third body being connected to the emitter of the second boost transistor through the second half first boost resistor; and
a fourth MOS transistor having a fourth gate, a fourth source, a fourth drain, and a fourth body, the fourth gate being connected to the third source, third drain and third body, the fourth source, the fourth drain, and the fourth body being connected to the third gate.

12. An adaptive equalization circuit for equalizing the frequency response of varying lengths of transmission line, the adaptive equalization circuit comprising:
first transconductance means for sinking a pair of first complementary currents in response to a pair of complementary input signals;
second transconductance means for sinking a pair of second complementary currents in response to the pair of complementary input signals, the pair of second complementary current having a waveshape which approximately mathematically represents an inverse transfer function of a maximum length of transmission line, each current of the pair of first complementary currents corresponding to one current of the pair of second complementary currents;
current summing means for varying a magnitude of the pair of first complementary currents, for inversely varying a magnitude of the pair of second complementary currents in response to a pair of complementary control signals, and for combining each current of the pair of first complementary currents with its corresponding current from the pair of second complementary currents to sink a corresponding pair of complementary output currents; and
output means for generating a pair of complementary output signals in response to the pair of complementary output currents,
wherein, when the minimum length of transmission line is utilized, the pair of complementary control signals vary the magnitude of the pair of first complementary currents and inversely vary the magnitude of the pair of second complementary currents so that the pair of complementary output signals are substantially formed by only the pair of first complementary currents, and
wherein, when the maximum length of transmission line is utilized, the pair of complementary control signals vary the magnitude of the pair of first complementary currents and inversely vary the magnitude of the pair of second complementary currents so that the pair of complementary output signals are substantially formed by only the pair of second complementary currents, and wherein, when an intermediate length of transmission line is utilized, the pair of complementary control signals vary the magnitude of the first complementary currents and inversely vary the magnitude of the pair of second complementary currents so that the pair of complementary output signals are substantially formed by both the pair of first complementary currents and the pair of second complementary currents.

13. The circuit of claim 12 wherein the pair of first complementary currents include a first current and a first inverted current, the first current having a first output current component and a first output boost current component, the first inverted current having a first inverted output current component and a first inverted output boost current component.

14. The circuit of claim 14 wherein the pair of second complementary currents include a second current and an second inverted current, the second current having a second output current component and a second output boost current component, the second inverted current having a second inverted output current component and a second inverted output boost current component.

15. The circuit of claim 14 wherein the pair of complementary output currents include an output current and an inverse output current, the output current component corresponding with the first output current component of the first current and the second output current component of the second current, the inverse output current component corresponding with the first inverted output current component of the first inverted current and the second inverted output current component of the second inverted current.

16. The circuit of claim 15 wherein the current summing means inversely varies a magnitude of the first output current component and a magnitude of the second output current component.

17. The circuit of claim 16 wherein the current summing means inversely varies a magnitude of the first inverted output current component and a magnitude of the second inverted output current component.

18. The circuit of claim 17 wherein the current summing means combines the first output boost current component with the first output current component to produce the first current and generates the first output boost current component current so that a magnitude of the first output boost current component is substantially equivalent to a magnitude of the second output current component.

19. The circuit of claim 18 wherein the current summing means combines the second output boost current component current with the second output current component to produce the second current and generates the second output boost current component current so that a magnitude of the second output boost current component is substantially equivalent to a magnitude of the first output current component.

20. The circuit of claim 19 wherein the current summing means combines the first inverted output boost current component with the first inverted output current component to produce the first inverted current and generates the first inverted output boost current component so that a magnitude of the first inverted output boost current component current is substantially equivalent to a magnitude of the second inverted output current component.

21. The circuit of claim 20 wherein the current summing means combines the second inverted output boost current component with the second inverted output current component to produce the second inverted current and generates the second inverted output boost current component so that a magnitude of the second inverted output boost current component is substantially equivalent to a magnitude of the first inverted output current component.

* * * * *

UNITED STATES PATENT AND TRADEMARK OFFICE
CERTIFICATE OF CORRECTION

PATENT NO. : 5,337,025
DATED : August 9, 1994
INVENTOR(S) : Gary D. Polhemus

It is certified that error appears in the above-indentified patent and that said Letters Patent is hereby corrected as shown below:

In The Claims:

In Col. 15, line 68, after "with" insert --a--.

In Col. 16, line 20, delete "Signal" and replace with --signal--.

In Col. 16, line 49, delete "Signal" and replace with --signal--.

In Col. 19, line 22, delete the second occurence of "14" and replace with --13--.

Signed and Sealed this

Eleventh Day of October, 1994

Attest:

Attesting Officer

BRUCE LEHMAN

Commissioner of Patents and Trademarks